(12) United States Patent
Gröne

(10) Patent No.: US 11,333,315 B2
(45) Date of Patent: May 17, 2022

(54) PROJECTION HEADLIGHT FOR A VEHICLE AND VEHICLE

(71) Applicant: Hella GmbH & Co. KGaA, Lippstadt (DE)

(72) Inventor: Stefan Gröne, Brakel (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/278,863

(22) PCT Filed: Sep. 25, 2018

(86) PCT No.: PCT/EP2018/075860
§ 371 (c)(1),
(2) Date: Mar. 23, 2021

(87) PCT Pub. No.: WO2020/064086
PCT Pub. Date: Apr. 2, 2020

(65) Prior Publication Data
US 2022/0034468 A1  Feb. 3, 2022

(51) Int. Cl.
*B60Q 1/08*  (2006.01)
*F21S 41/43*  (2018.01)
*F21S 41/25*  (2018.01)
*F21S 41/143*  (2018.01)
*F21S 45/47*  (2018.01)
*F21S 41/20*  (2018.01)
*F21W 103/60*  (2018.01)

(52) U.S. Cl.
CPC ............ *F21S 41/43* (2018.01); *F21S 41/143* (2018.01); *F21S 41/25* (2018.01); *F21S 41/285* (2018.01); *F21S 45/47* (2018.01); *F21W 2103/60* (2018.01)

(58) Field of Classification Search
None
See application file for complete search history.

(56) References Cited

U.S. PATENT DOCUMENTS

2015/0175054 A1* 6/2015 Yatsuda ................ F21S 41/255
                                                          362/465
2015/0375672 A1* 12/2015 Takahashi ............ F21S 41/675
                                                          701/49
2017/0210282 A1   7/2017 Barros

FOREIGN PATENT DOCUMENTS

DE  102004058153 A1  10/2005
DE  102014203313 A1   8/2015
DE  102017104488 A1   2/2018
WO   2014045168 A1    3/2014

* cited by examiner

*Primary Examiner* — Elmito Breval
(74) *Attorney, Agent, or Firm* — Husch Blackwell LLP

(57) ABSTRACT

A projection headlight for a vehicle is provided comprising at least one light source, a projection lens, a condenser lens arranged between the at least one light source and the projection lens, and at least one printed graphic arranged between the condenser lens and the projection lens. The condenser lens has a flat side and a curved side. The at least one printed graphic is printed on the flat side of the condenser lens. Further, a vehicle is provided having at least one such projection headlight.

10 Claims, 5 Drawing Sheets

PROJECTION HEADLIGHT FOR A VEHICLE AND VEHICLE

CROSS REFERENCE

This application claims priority to PCT Application No. PCT/EP2018/075860, filed Sep. 25, 2018, the entirety of which is hereby incorporated by reference.

FIELD OF THE INVENTION

The invention is related to a projection headlight for a vehicle, comprising at least onelight source, a projection lens, a condenser lens arranged between the at least one light source and the projection lens, the condenser lens having a flat side and a curved side, and comprising at least one printed graphic arranged between the condenser lens and the projection lens. Furthermore, the invention is related to a vehicle having at least one projection headlight.

BACKGROUND

It is known from the prior art that by means of a projection headlight in a motor vehicle a warning symbol can be projected onto the roadway in the principle of a slide projector. For this purpose, a graphic printed on a (plastic) slide is imaged using a projection lens. In order to achieve efficient illumination of the slide, a condenser lens is inserted between the light source and the slide. The slide is arranged between the condenser lens and the projection lens as an independent component. Such a projection headlight is shown in FIGS. 1 and 2. The projection headlight (10) comprises at least one light source (20), a projection lens 40, a condenser lens (30) arranged between the at least one light source (20) and the projection lens (40). The condenser lens (30) is having a flat side (32) and a curved side (34). The projection headlight (10) further comprises a slide (60) with a printed graphic (50). The slide (60) is arranged between the condenser lens (30) and the projection lens (40). The slide (60) is spaced to the condenser lens (30) with a certain distance.

The disadvantage of such a projection headlight is that it is not cost effective and is not very efficient due to light losses at the surfaces of the slide. Because of the arrangement of the slide between the condenser lens and the projection lens the emitted beams of the light source of the projection headlight have to pass through the surfaces of the slide. This causes light losses within the projection headlight.

SUMMARY OF THE INVENTION

The object of the present invention is to provide a projection headlight for a vehicle, in particular for a motor vehicle, which at least partially avoids the previously described disadvantages. Particularly, it is the object of the present invention to provide a projection headlight for a vehicle, in particular for a motor vehicle, which is economical, which is small size and which is efficient due to lower light losses.

Aforesaid problem is solved by a projection headlight with the features of claim 1 and by a vehicle with the features of claim 9. Features and details of the present invention result from the subclaims, the description and the respective drawings. Features and details discussed with respect to the inventive projection headlight are also related to features and details discussed with respect to the vehicle and vice versa.

According to a first aspect of the invention the problem is solved by a projection headlight for a vehicle, comprising at least one light source, a projection lens, a condenser lens arranged between the at least one light source and the projection lens. The condenser lens is having a flat side and a curved side. The projection headlight further comprises at least one printed graphic arranged between the condenser lens and the projection lens. The at east one printed graphic is printed on the flat side of the condenser lens.

That means, the graphic to be imaged onto the roadway is printed directly on the flat surface of the condenser lens. The printing can be done in digital printing, screen printing or in particular in pad printing. However, the graphic can also be a coating, for example a colored coating with pigments or dyes and interference coatings, into which the graphic to be generated is introduced by ablation processes, for example removal by means of laser. No additional slide is needed. This saves costs. Advantageously there is no distance between the graphic and the condenser lens. Furthermore, the projection headlight is more efficient due to lower light losses, since the elimination of the slide eliminates two interfaces at the transition between air and (plastic) slide. In addition, the size of the projection headlight can be reduced by the omission of a component.

The projection headlight can comprise only one light source. Advantageously the projection headlight comprises several light sources, which can all be the same design. The projection headlight may have a housing in which the individual components are arranged.

Preferred is a projection headlight, wherein a collimator is arranged in front of each light source. That means, each light source has its own collimator which is used to generate light with a parallel or an approximately parallel beam path from each light source in direction to the condenser lens.

Preferred is a projection headlight, wherein the flat side of the condenser lens faces the projection lens and the curved side of the condenser lens faces the light source. For this purpose, the condenser lens is rotated in contrast to the location of the condenser lens of the projection headlight according to the prior art shown in FIG. X. The condenser lens is rotated in the existing product by 180° and moved to the correct focus position with respect to the desired image. Such an arrangement of the condenser lens in the projection headlight allows that the graphic is located in the beam path of the light of the light source behind the condenser lens.

The light source can be any type of light sources. Preferred is a projection headlight, wherein the at least one light source is a light-emitting diode (LED). In particular, a projection headlight is preferred, which has a plurality of LEDs.

The at least one light source can be arranged at a circuit board. Further, the circuit board and therefore the at least one light source can be arranged at a heatsink. This allows efficient cooling of the LEDs.

Preferred is a projection headlight, wherein the printed graphic is a warning symbol or a traffic sign. Such a projection headlight allows imaging the warning symbol or a traffic sign onto the roadway. Hereby, a driver of a vehicle can be easily and quickly notified of dangerous situations.

A projection headlight is preferred, which has an adjustment mechanism for adjusting the position of the projection headlight relative to the vehicle. As a result, the position or distance of the projected graphic in front of the vehicle can be adjusted.

According to a second aspect of the invention the problem is solved by a vehicle having at least one projection headlight, wherein the at least one projection headlight is a projection headlight according to the first aspect of the invention. Therefore, the vehicle according to the invention can offer the same advantages as those described for the projection headlight according to the invention.

A vehicle, in particular a motor vehicle, can comprise at least one projection headlight. Preferred is a vehicle, in particular a motor vehicle, which has two or more projection headlights according to the first aspect of the invention. Such a vehicle allows a driver to project a warning symbol in front of the vehicle onto the road during a driving situation to indicate a danger or an obstacle.

The projection headlight is positioned as a whole in an opening of a body part of the vehicle. The appearance of the projection headlight is thus characterized by the arrangement of the light sources and the lenses.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
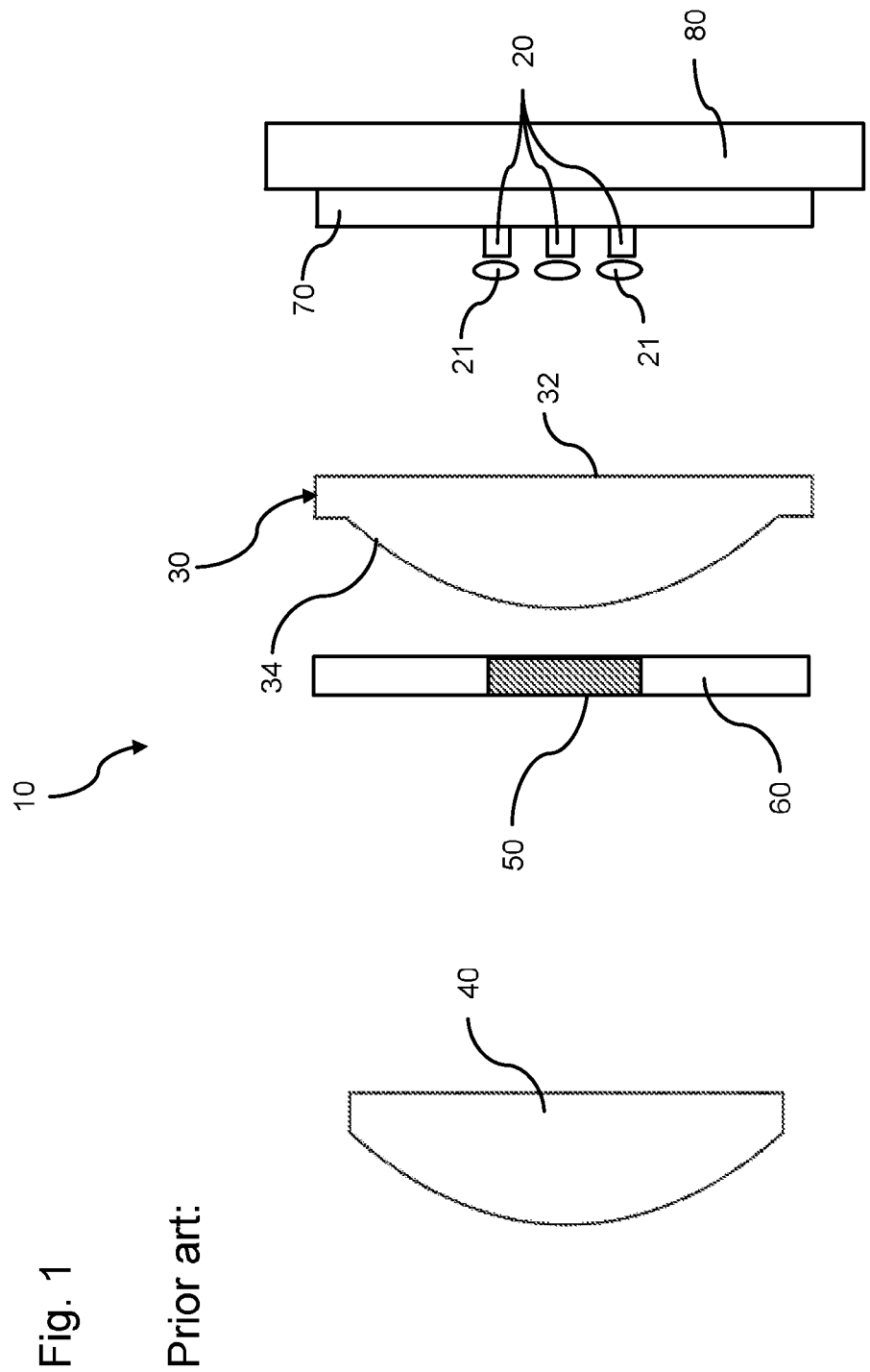
FIG. 1 is a schematic representation of a projection headlight of a motor vehicle according to the prior art.

FIG. 1 shows a schematic representation of a projection headlight 10 of a motor vehicle according to the prior art.

Figure 2:
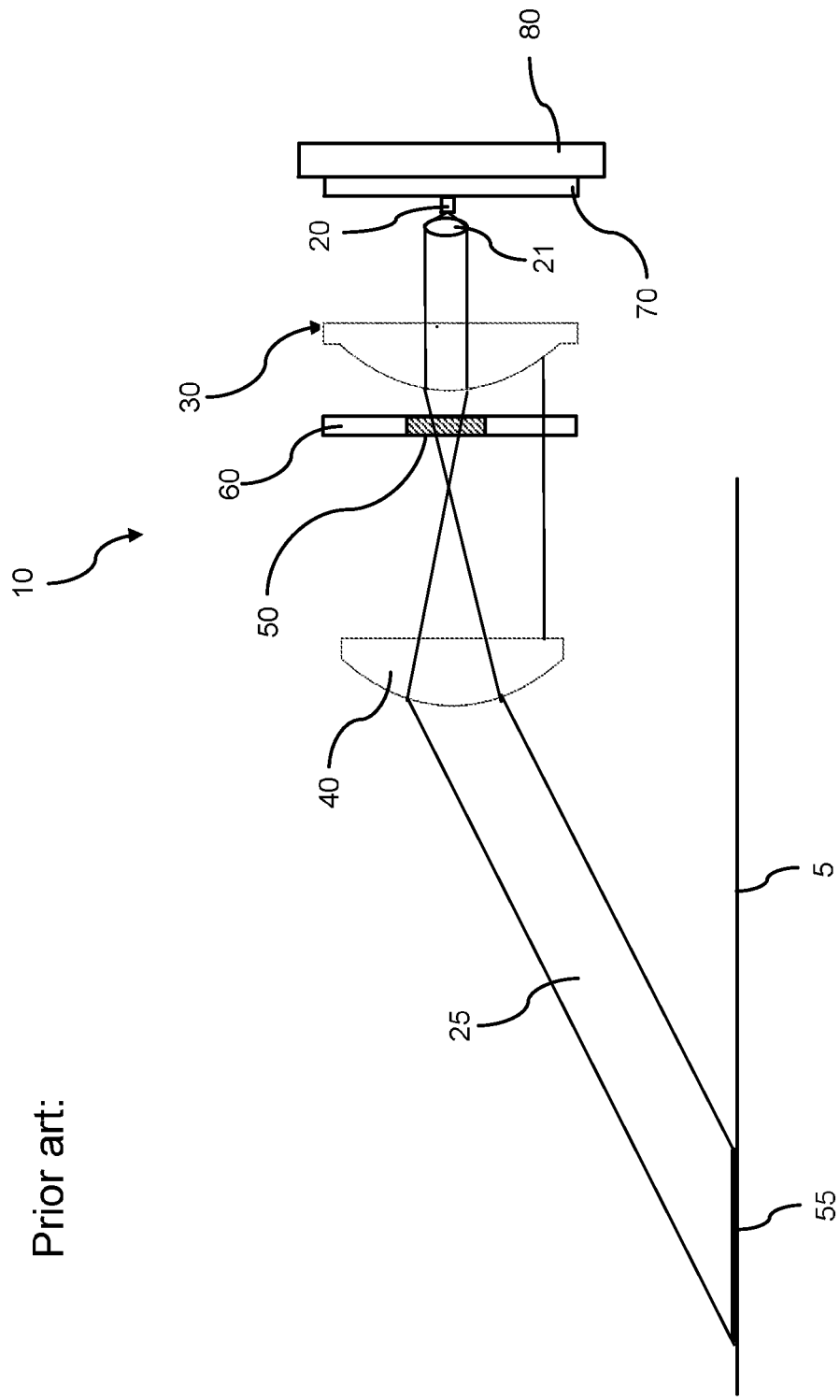
FIG. 2 illustrates the projection headlight according to FIG. 1 showing a beam path of a light source of the projection headlight.

In FIG. 2 the beam path of the light source 20 of the projection headlight 10 according to FIG. 1 is shown.

Figure 3:
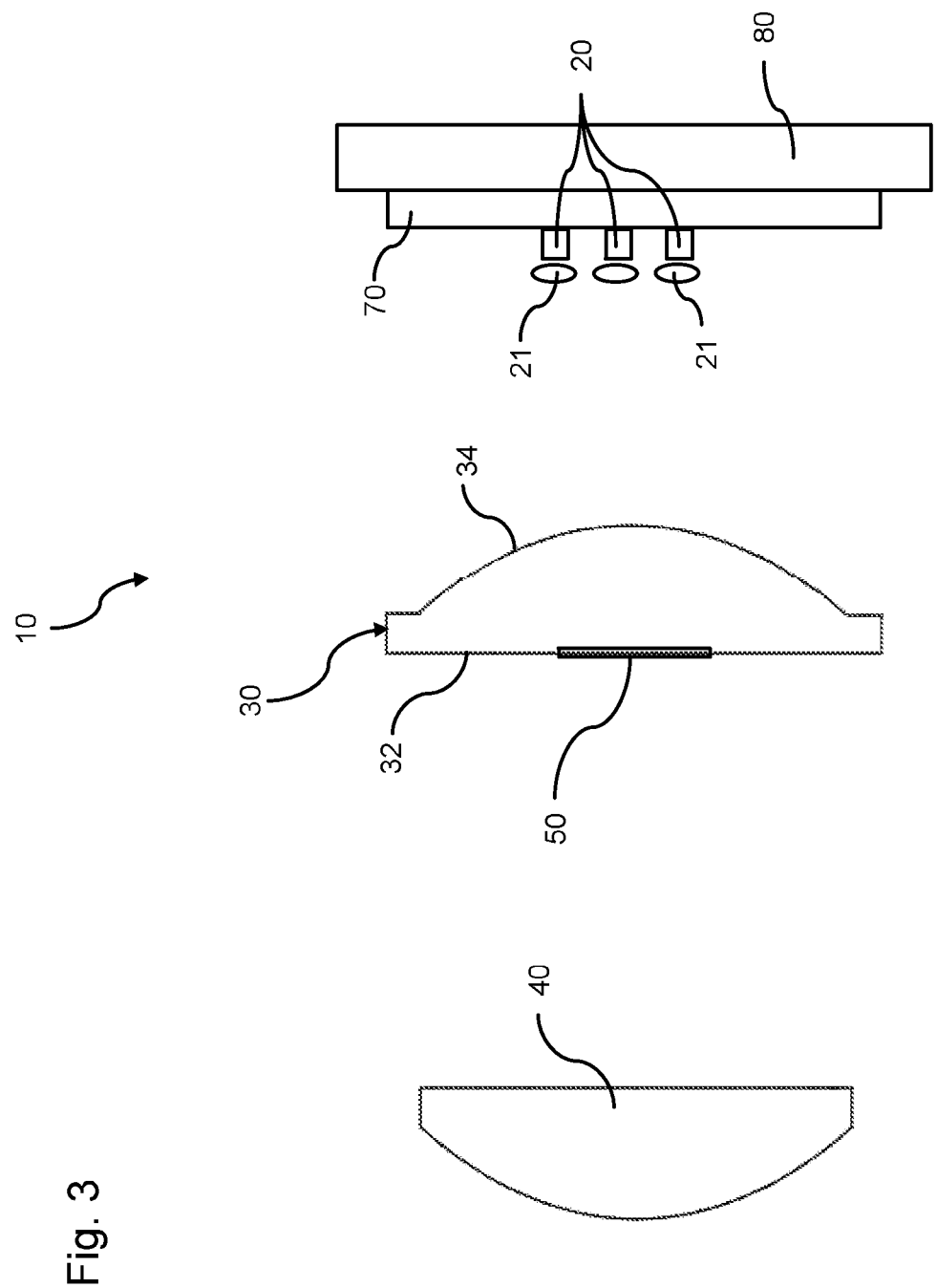
FIG. 3 is a schematic representation of a projection headlight of a motor vehicle according to the invention.
Figure 4:
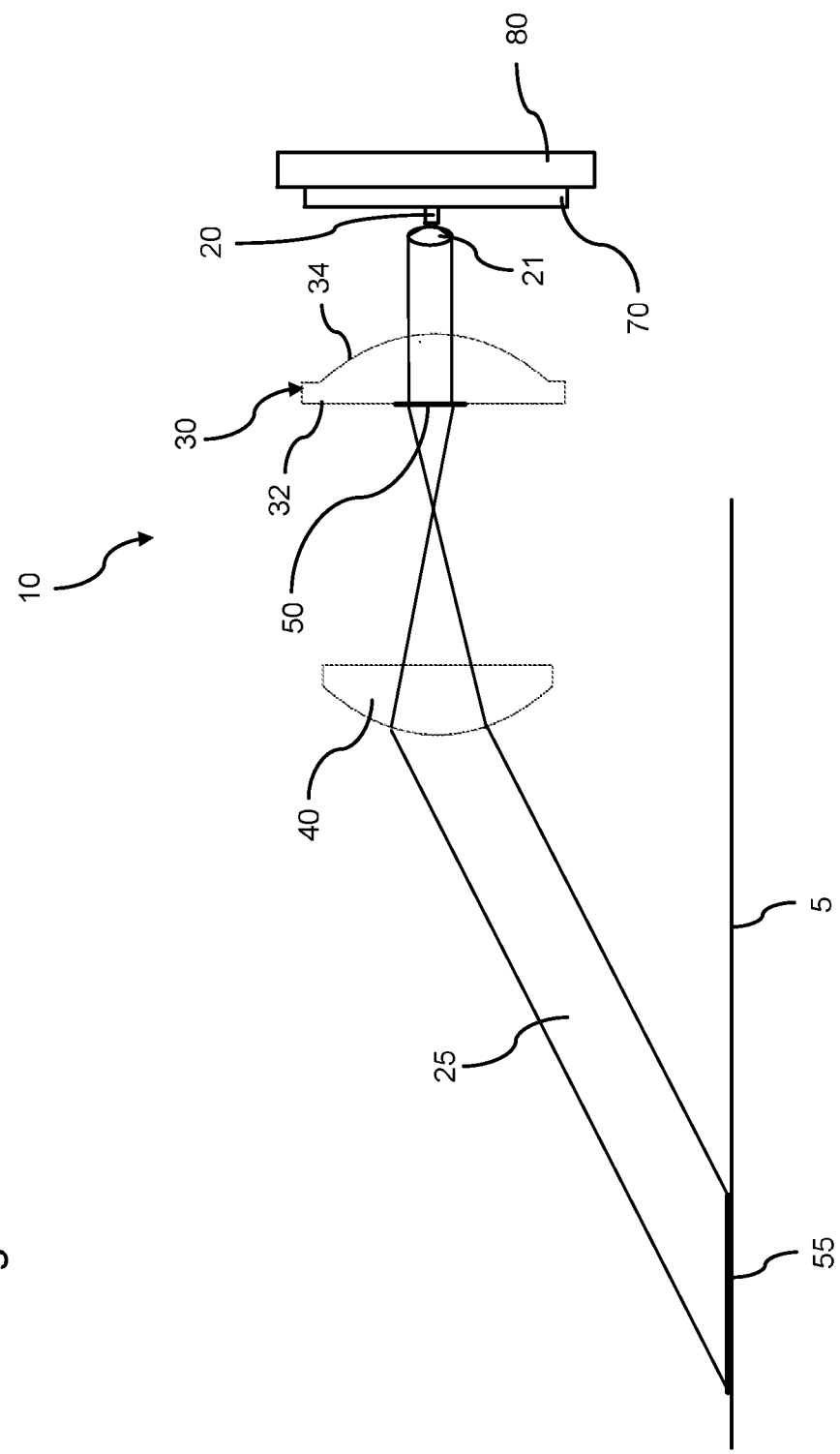
FIG. 4 is a schematic representation of another projection headlight of a motor vehicle according to the invention.

FIG. 3 shows a schematic representation of a projection headlight 10 of a motor vehicle 1 according to the invention. The projection headlight 10 comprises several light sources 20, a projection lens 40 and a condenser lens 30 arranged between the light sources 20 and the projection lens 40. In front of each light source a collimator 21 is arranged. The collimator 21 is used to generate light with a parallel or an approximately parallel beam path from each light source 20 in direction to the condenser lens 30. The condenser lens 30 comprises a flat side 32 and a curved side 34. Further, the projection headlight 10 comprises a printed graphic 50, which is printed on the flat side 32 of the condenser lens 10. In contrast to the arrangement of the printed graphic 50 at the slide 60, as shown in the projection headlight 10 of FIGS. 1 and 2 according to the prior art, the projection headlight 10 according to the invention does not have a slide. The printed graphic 50 is printed directly onto the surface of the flat side 32 of the condenser lens 10. That means, the graphic 50 to be imaged onto the roadway 5, see FIG. 4, is printed directly on the flat surface of the condenser lens 30. No additional slide is needed. This saves costs and space. The size of the projection headlight 10 can be reduced by the omission of a slide. The projection headlight 10 can be produced with smaller dimensions in contrast to a projection headlight 10 according to the prior art shown in FIGS. 1 and 2. Advantageously there is no distance between the printed graphic 50 and the condenser lens 30. Furthermore, the projection headlight 10 is more efficient due to lower light losses, since the elimination of the slide eliminates two interfaces at the transition between air and (plastic) slide. It is possible to arrange two or more printed graphics 50 on the flat surface 32 of the condenser lens 30, see FIG.

In FIG. 4 a schematic representation of another projection headlight 10 of a motor vehicle 1 according to the invention is shown. In contrast to the projection headlight 10 shown in FIG. 3 the projection headlight 10 shown in FIG. 4 has only one light source 20. Further, a beam path 25 of the light source 20 of the projection headlight 10 is disclosed. The light beam 25 emitted by the light source 20 passes through the collimator 21 which is arranged between the condenser lens 30 and the light source 20. The collimator 21 generates a parallel or an approximately parallel beam path in direction to the condenser lens 30. The light beam 25 passes through the condenser lens 30 and then immediately the printed graphic 50 on the flat side 32 of the condenser lens 30. After passing the printed graphic 50 the light beam 25 passes the projection lens 40 which projects the printed graphic 50 onto the roadway 5 in front of a vehicle in which the projection headlight 10 is arranged.

The light sources 20 of the projection headlight 10 are advantageously light-emitting diodes (LED). The light sources 20 can be arranged at a circuit board 70 of the projection headlight 10. The circuit board 70 can be flexible. Further, the circuit board 70 and therefore the at least one light source 20 can be arranged at a heatsink 80. This allows efficient cooling of the at least one light source 20.

Figure 5:
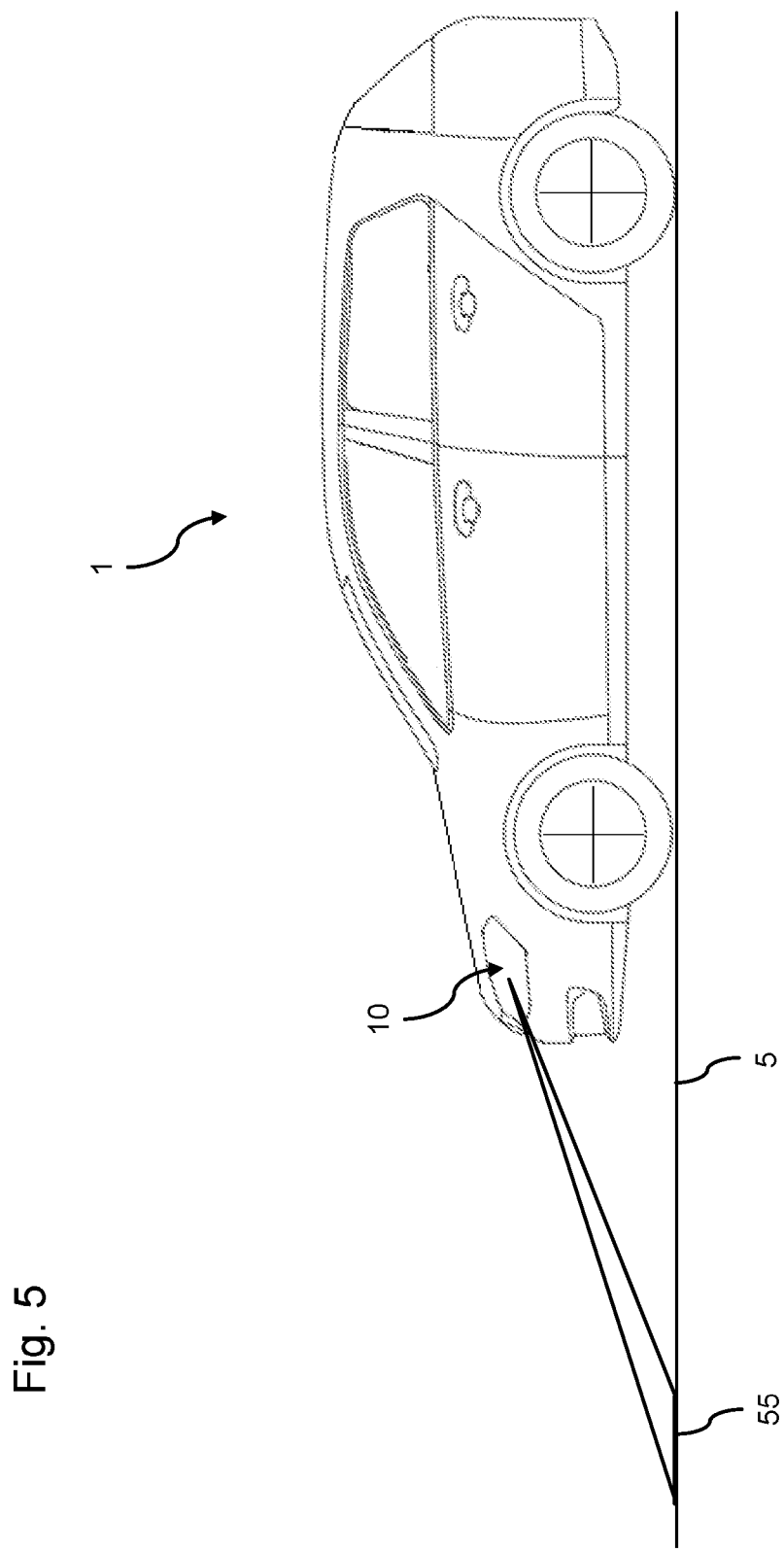
FIG. 5 is a schematic representation of a vehicle with a projection headlight according to the invention.

The printed graphic 50 can be a warning symbol or a traffic sign. The projection headlight 10 allows imaging such a warning symbol or a traffic sign onto the roadway 5 in front of the vehicle 1, see FIG. 5. The driver of the vehicle 1 can be easily and quickly notified of dangerous situations by imaging the warning symbol or a traffic sign onto the roadway 5.

The projection headlight 10 and/or the vehicle 1 can comprise an adjustment mechanism for adjusting the position of the projection headlight 10 relative to the vehicle 1. As a result, the position or distance of the projected graphic 55 in front of the vehicle 1 can be adjusted.

The vehicle 1 can be a motor vehicle, like a lorry or a car. Further, the vehicle 1 can be a motor cycle, a bus or even a train.

REFERENCE NUMBER LIST 1 vehicle
5 roadway
10 projection headlight
20 light source
21 collimator
25 light beam
30 condenser lens
32 flat side
34 curved side
40 projection lens
50 printed graphic
55 projected graphic
60 slide
70 circuit board
80 heatsink

The invention claimed is:

1. A projection headlight for a vehicle, the projection headlight comprising:
   at least one light source,
   a projection lens,
   a condenser lens arranged between the at least one light source and the projection lens, the condenser lens having a flat side and a curved side, and
   at least one printed graphic arranged between the condenser lens and the projection lens, wherein the at least one printed graphic is printed on the flat side of the condenser lens.

2. The projection headlight according to claim 1, wherein a collimator is arranged in front of each light source.

3. The projection headlight according to claim wherein the flat side of the condenser lens faces the projection lens and the curved side of the condenser lens faces the light source.

4. The projection headlight according to claim 1, wherein the projection lens is an aspherical projection lens.

5. The projection headlight according to claim 1, wherein the at least one light source is a light-emitting diode (LED).

6. The projection headlight according to claim 1, wherein that the at least one light source is arranged at a circuit board.

7. The projection headlight according to claim 6, wherein the circuit board is arranged at a heatsink.

8. The projection headlight according to claim 1, wherein the printed graphic is a warning symbol or a traffic sign.

9. A vehicle having at least one projection headlight according to claim 1.

10. The vehicle according to claim 9, wherein the vehicle is a motor vehicle.

* * * * *